Oct. 6, 1936.  H. F. GLUNZ  2,056,720
METHOD OF AND APPARATUS FOR MAKING AND SEALING CAPS ON CONTAINERS
Filed June 13, 1933  4 Sheets—Sheet 1
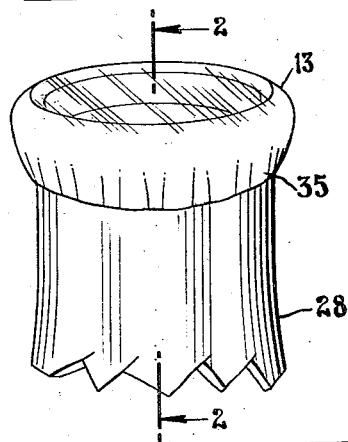
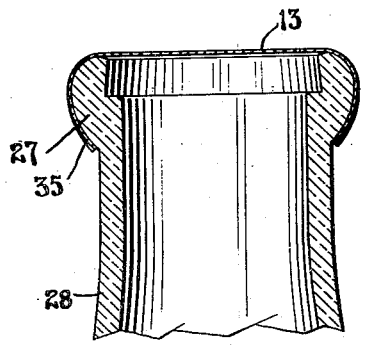
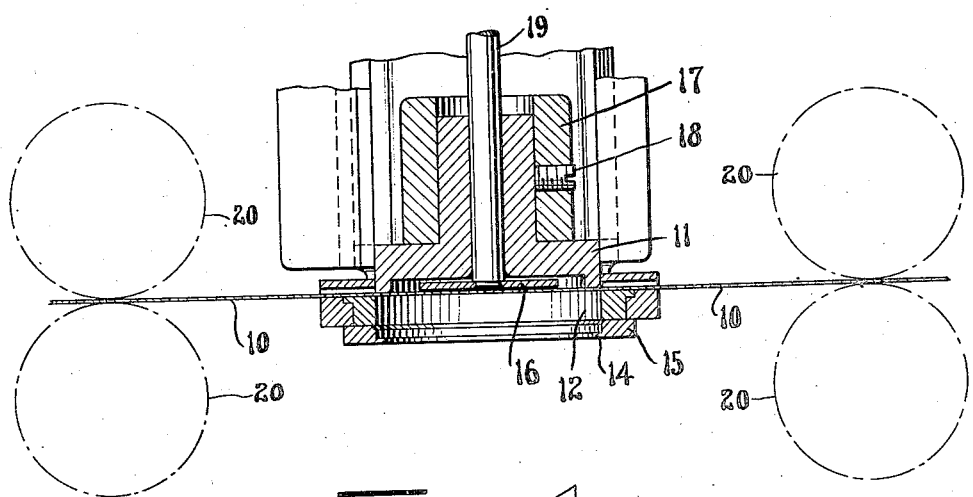
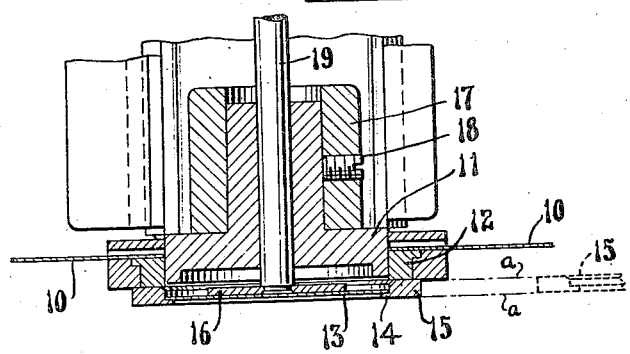
INVENTOR
Henry F. Glunz
BY
Darby & Darby
ATTORNEYS Oct. 6, 1936. H. F. GLUNZ 2,056,720
METHOD OF AND APPARATUS FOR MAKING AND SEALING CAPS ON CONTAINERS
Filed June 13, 1933 4 Sheets-Sheet 2
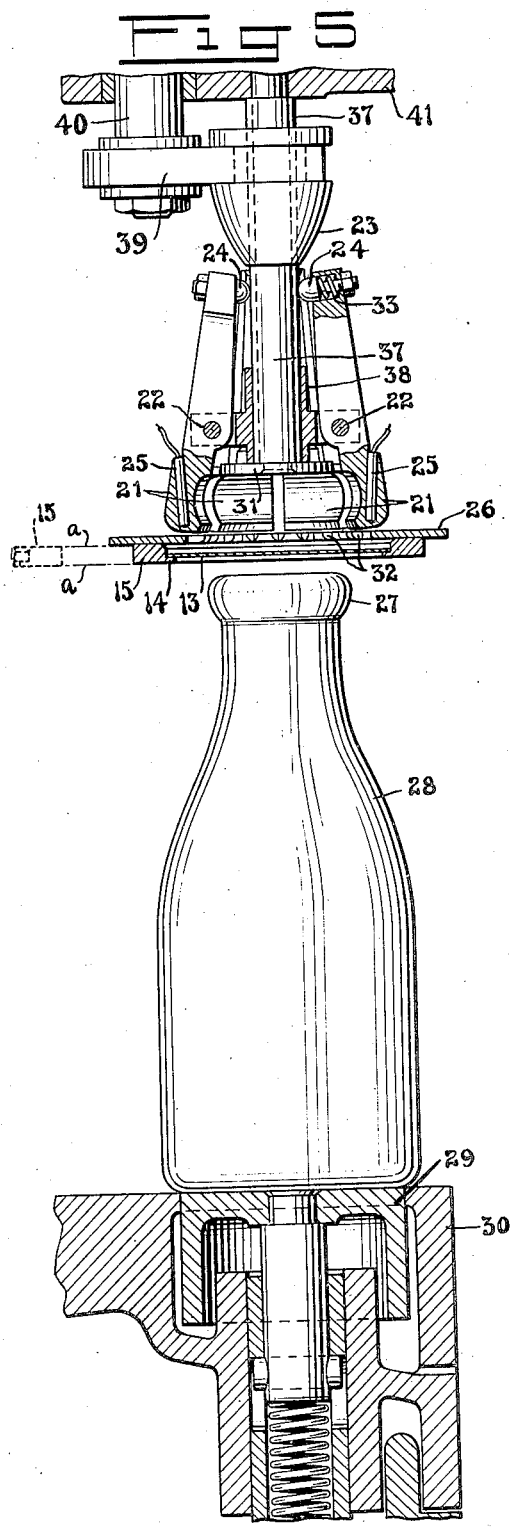
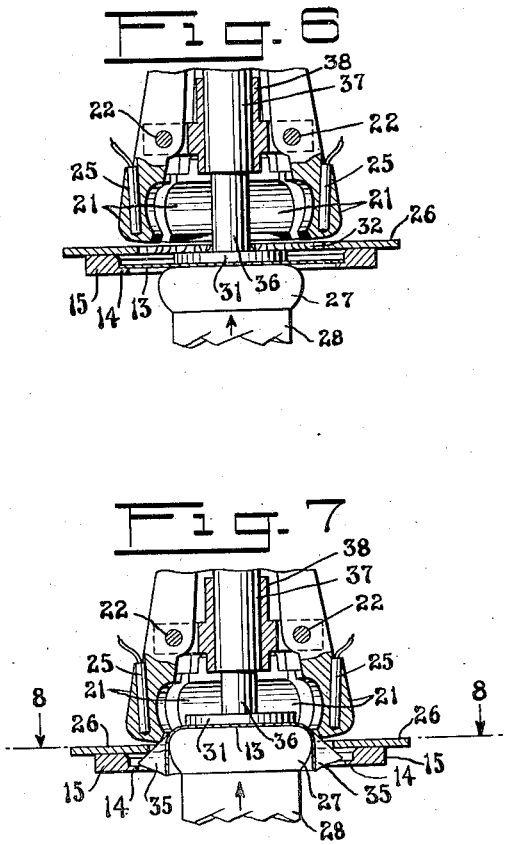
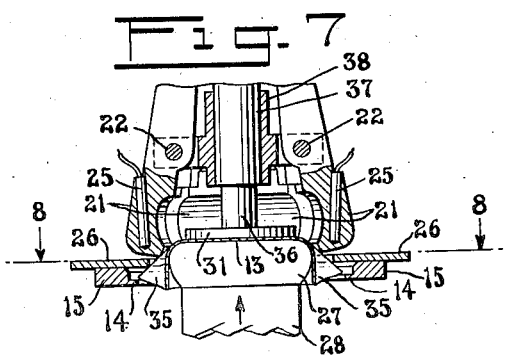
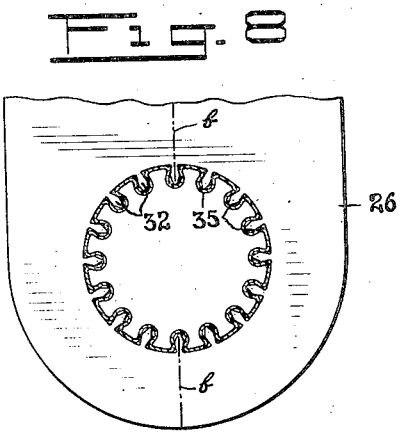
INVENTOR
Henry F. Glunz
BY
Darby + Darby
ATTORNEYS

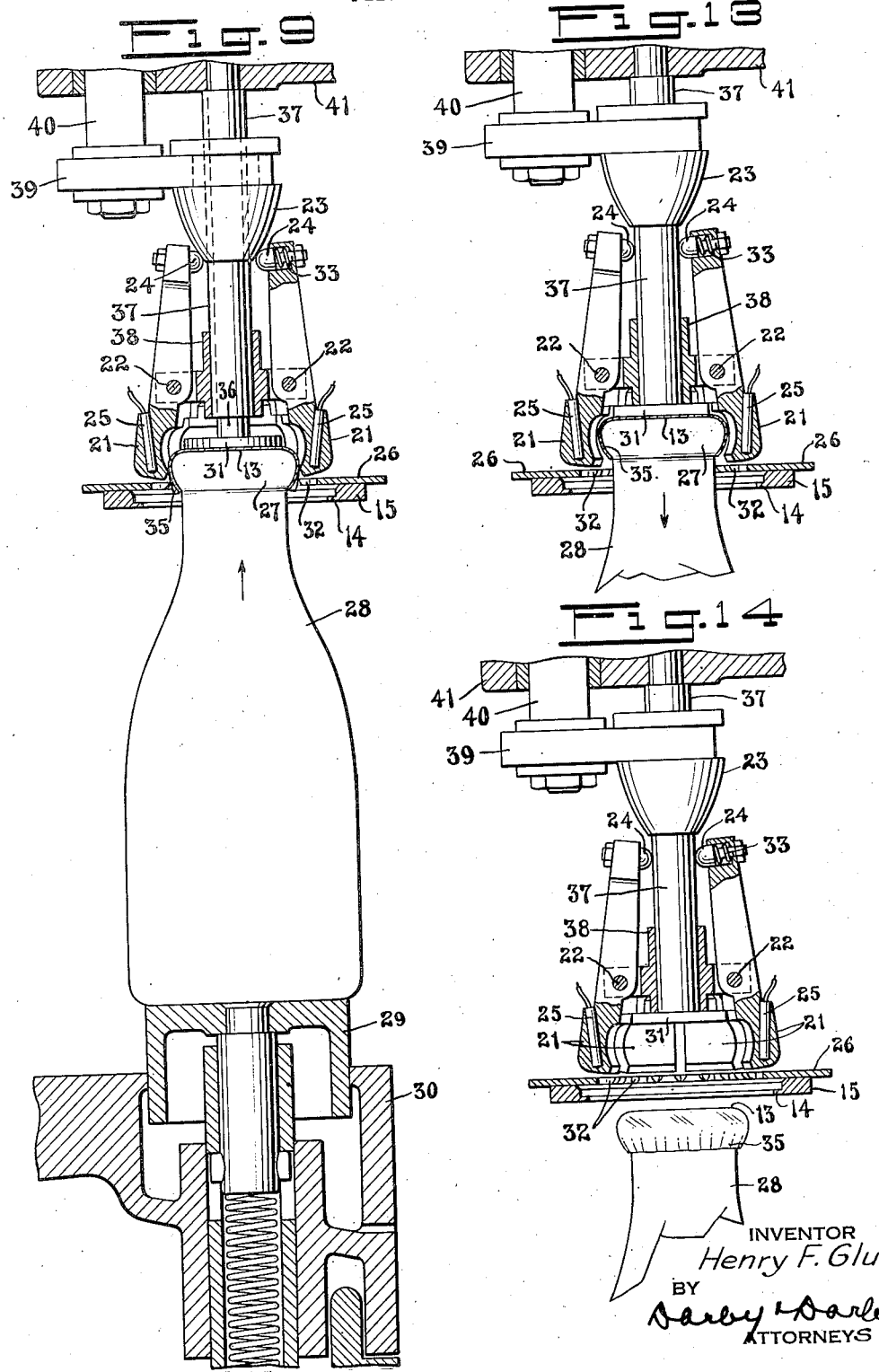
Oct. 6, 1936. H. F. GLUNZ 2,056,720
METHOD OF AND APPARATUS FOR MAKING AND SEALING CAPS ON CONTAINERS
Filed June 13, 1933 4 Sheets-Sheet 3
INVENTOR
Henry F. Glunz
BY
Darby & Darby
ATTORNEYS Oct. 6, 1936. H. F. GLUNZ 2,056,720
METHOD OF AND APPARATUS FOR MAKING AND SEALING CAPS ON CONTAINERS
Filed June 13, 1933 4 Sheets-Sheet 4
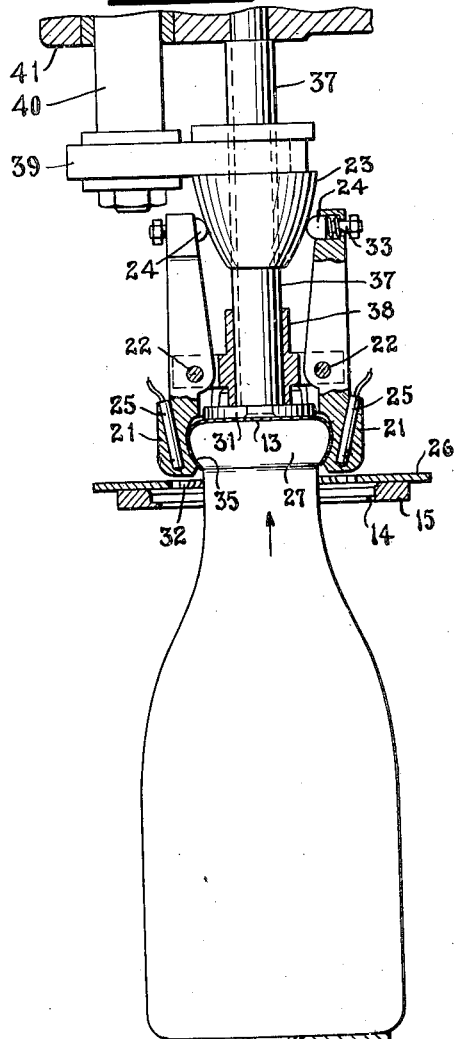
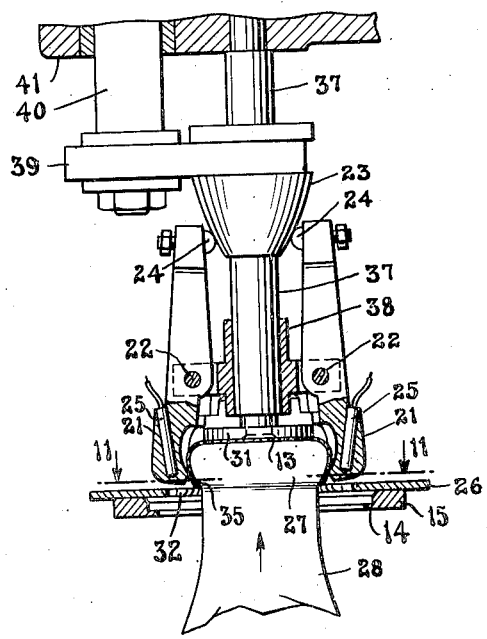
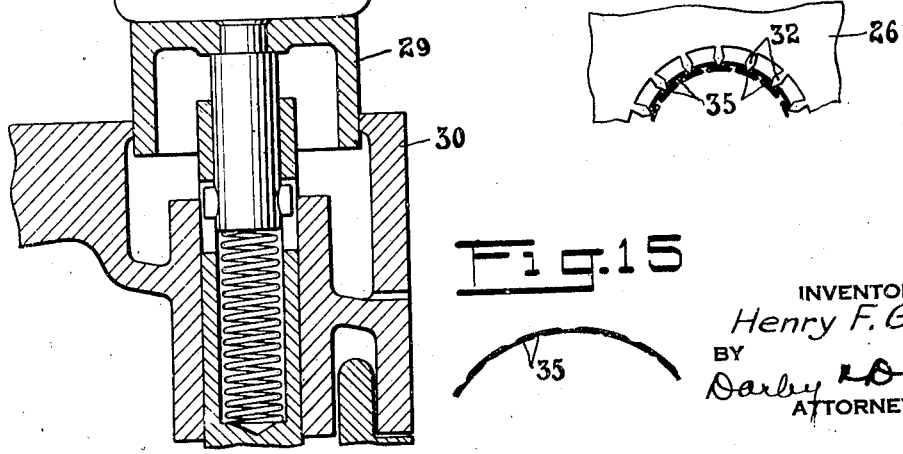
INVENTOR
Henry F. Glunz
BY
Darby＆Darby
ATTORNEYS Patented Oct. 6, 1936

2,056,720

UNITED STATES PATENT OFFICE 2,056,720

METHOD OF AND APPARATUS FOR MAKING AND SEALING CAPS ON CONTAINERS

Henry F. Glunz, Saratoga Springs, N. Y., assignor, by mesne assignments, to The Heat Seal Corporation, New York, N. Y., a corporation of Maine Application June 13, 1933, Serial No. 675,557

16 Claims. (Cl. 226—83)

This invention relates to improvements in methods of and apparatus for making transparent caps from cellulose acetate or other cellulose derivative or material, and has for its object the making of caps and sealing the same on containers, such as milk bottles, so as to provide a transparent safety seal.

Another object includes the provision of caps formed over the mouth of containers and sealed thereon under control of temperature conditions which are applied to the cellulose acetate in timed gradiations beginning with a temperature just sufficient to soften the cellulose acetate or other derivative, and ending with a temperature high enough or higher than is required to weld or fuse the same. In other words the cap forming cellulose derivative is subjected to an initial temperature just sufficient to give the cap forming material a permanent set.

This stage may be designated as the first heating stage and is applied to the cellulose material at the beginning of the cap forming period. Inasmuch as the cellulose material is readily fused or ignited if not properly protected, it is important that the temperature be kept low until the material is formed about the mouth of the bottle, and is thus protected against scorching or fusing. Immediately upon completion of the cap or, in some cases, during the last stages of its formation about the mouth of the bottle or container, the temperature is increased to a sufficiently high degree to effect a fusing or welding together of the portions of the cellulose material forming the completed cap. This temperature is considerably above that of sterilization or of fusing of the cellulose acetate. Such high temperature may be safely applied to the cap forming cellulose material as soon as the material is in contact with and protected by the cool surface of the container.

It is a further purpose of my invention to form the caps with spaced folds or pleats that are made at the warming temperature above noted. These pleats or folds are then ironed out and welded or fused together at or above the welding or fusing temperature to thereby form a cap and seal of transparent cellulose acetate material about and on the lip of the container.

Another object of the invention is the provision of mechanism for cutting and continuously supplying cap forming blanks from sheets of thin flexible cellulose acetate or other transparent cellulose derivative, and supply the same to a container which has been moved by suitable means (not shown) into position for receiving the blank. I also provide means for folding and pleating the outer zone or skirt portion of the cap forming blank over the crown of the container; together with means for giving to the cap forming material its initial molding temperature. Furthermore I provide mechanism for folding and molding the skirt of the cap forming material at a sufficient degree of heat to thereby seal the same over the mouth of the container to thus obtain a sterile, transparent safety seal.

Referring now to the accompanying drawings.

Figure 1 shows a view in perspective of a transparent cap made in accordance with the principles of my invention and sealed over the mouth of a container;

Fig. 2 is a view taken on the line 2—2 of Fig. 1;

Fig. 3 is a view in section of a mechanism for cutting and supplying the cap forming blanks or discs from thin sheets or cellulose acetate or the like;

Fig. 4 is a view of the same mechanism shown in Fig. 3 in which the cap forming blank is cut and lodged in the disc holding and conveying ring;

Fig. 5 is an elevational view showing the relative positions of the container, its support, the cap forming disc and disc holding ring, the pleating member, and the cap forming jaws or head;

Fig. 6 is a view of the head showing the position of the jaws at the moment when the disc holding pad is lowered onto the cap forming disc and the mouth of the container is raised up to the disc ready to be enclosed by the cap forming blank;

Fig. 7 is a view similar to that of Fig. 6, excepting that the mouth of the container has been moved up through the opening in the pleating or folding plate and the cap forming disc is in the act of being folded over the bead which surrounds the mouth of the container;

Fig. 8 is a plan view of the disc folding or pleating plate;

Fig. 9 is a view similar to that of Fig. 5 but showing the jaws just beginning to close down on the folds of the cap forming blank;

Fig. 10 shows the jaws nearly closed upon the cap forming blank and Fig. 12 shows the jaws fully closed thereover;

Fig. 11 is a fractional view of the folding or pleating plate showing the folds fully formed and ironed down, taken on the line 11—11 of Fig. 10;

Fig. 13 shows the position of the container and the jaws in the act of being released;

Fig. 14 shows the jaws fully opened with the container removed and ready to be replaced by an unsealed container; and Fig. 15 is a section of the folds in the completed cap.

The same reference characters refer to similar parts throughout the several views.

As a preferred mode of operation for providing blanks from transparent caps formed in place over the mouth of a container and sealed thereon, I cut the blank of required size, as needed, from thin sheets of cellulose acetate. While the thickness of the blanks may vary, I have found that sheets of thickness from .001 to .002 inch are well suited for cap forming blanks. The best size of blanks is such as will just cover the mouth and the surrounding bead when the blank is folded or molded and fused into a cap and seal.

Mechanism for cutting blanks from a thin strip 10 of cellulose acetate, as illustrated by Figs. 3 and 4, consists of a die punch 11 operating in a die plate 12 to cut blanks 13 and place the same by pad 16 on ledge 14 of the disc holding and conveying ring 15. The die punch may be supported and reciprocated from a sleeve 17 and removably held therein by a screw 18. The blank or disc 13 is dislodged from the die and placed on the ledge by pad 16 which is supported on stem 19 and reciprocated thereby between positions shown in Figs. 3 and 4. Discs or cap forming blanks are cut from a sheet or strip 10 of cellulose acetate which is supplied as needed by proper means on feed rolls 20. The disc or blank holding and conveying ring 15 is made to slide along the path of the dotted lines a—a from its position in Fig. 4 to that in Fig. 5 by suitable means (not shown) during the return stroke of the die punch.

The disc is now in position (see Fig. 5) to be folded over the mouth of the container and formed into a cap that is fused and molded into a continuous one piece cap without any pockets or unsealed portions between the cap and the container. The cap, moreover, is sealed under such conditions as will render the seal perfectly sterile. There are no loose ends or flaps on the cap near the edge of the cap forming material so that no pockets or crevices are present to receive and lodge germs or other foreign matter underneath the cap. Moreover the cap is transparent and any data on the cover of the bottle, as for example the date, etc., is clearly visible through the protective cap.

In Fig. 5 is shown a cap forming mechanism comprising jaws 21 pivotally mounted at 22 and being operated by cam 23 and the point 24 at the end of the lever when the cam element is brought in contact with the pivoted point 24. Any number of jaws sufficient to completely surround the mouth of the container may be applied. I find it convenient to have six jaws so arranged. It will be noted that the jaws are provided with heating units 25 for electrically raising the temperature to a proper degree. Immediately beneath the jaws is the pleating or folding plate 26 and underneath that is the disc conveying ring 15 with the disc or blank 13 placed therein and ready to be folded upon the mouth 27 of the container 28. This container is positioned on a vertically movable table 29 which is supported in bracket 30. This table is moved up and down by suitable means, which are not herein shown. When the container is moved upward to be brought in contact with the blank 13, in the manner shown in Fig. 6, a disc holding pad 31 is brought down upon the blank from above so as to hold the same in firm position over the mouth of the container. At this position the lower portions of jaws 21 are in contact with the warmed pleating plate 26, which is thereby warmed sufficiently to soften the cellulose disc as the same is forced upward through the opening in the pleating plate. The material thereby is warmed sufficiently to give it a molding consistency and a permanent set as the same is molded over the mouth of the container in the manner shown in Fig. 7. At this point the folds 35 are being ironed out by the ends of jaws 21 coming in contact therewith as the container and cap are pushed upward into final position.

The disc forming pad 31 is suspended on stem 36 which is held slidably on shaft 37 and frame 41. On the lower end of said sleeve a bracket 38 is pivotally mounted for supporting jaws 21 on pivots 22. Near the upper end of said sleeve a cam 23 is slidably held by suitable operating means, as link 39 and rod 40. The rod is slidably held in said bracket or frame 41 and is operatively connected by suitable means, not herein shown, with the container supporting table 29 to move the table up and bring the mouth of the container between the cap forming jaws 21. Simultaneously therewith and in timed relation cam 23 is brought down into contact with points 24, thereby closing the jaws over the cap forming material on the mouth of the container. This operation and mode of procedure is carried out in progressive stages substantially as shown in Figs. 7, 9, 10 and 12.

It will be noted that when the jaws are closing the cap forming material over the mouth of the container is brought into running contact therewith beginning at or near the lower end of the jaws. This arrangement provides an ironing effect upon the folds of the cap forming material whereby the folds are pressed about the mouth of the container and are given a permanent set by reason of being warmed sufficiently therefor.

It will be noted that by the arrangement of the jaws closing upon a constantly increasing surface of material the heated end of the jaws becomes effective to a greater extent as they close upon the material in forming the cap. In other words the temperature at which the cap forming material is folded and pleated is just sufficient to render the material plastic, while, as above stated, the final temperature to which the material is exposed is sufficient to fuse the portions of the same together and to sterilize the seal as the same is formed.

By referring to Fig. 8 it will be noted that the pleating plate 26 may be made in sections and divided along any convenient line, as b—b, thereby permitting the plate to be opened when the sealed container is withdrawn from the capping head.

In order to direct the folds and properly distribute the same, projecting points or fingers 32 are distributed around the periphery of the plate in the manner shown in Fig. 8. These points give a directional fold of the material and cause the same to be evenly distributed around the crown of the container. At this stage it is noted that the cellulose material has been folded and heated sufficiently to give the folds a set and condition the same for unifying the material into a solid or fused mass. It is important that the temperature at which the folding is done be low for the reason that the cellulose acetate is fused readily when unprotected.

In order to prevent the fusing of the cellulose material during the stages when the lower molding temperature is applied thereto by reason of the heated jaws pressing upon the material, it is important that the same be protected against scorching or burning. It is found that the cooling temperature of the container is sufficient to prevent any ignition at this time and it will permit the cellulose material to be molded so as to be formed into a solid cap about the mouth of a container during the last stages of the sealing operation. This temperature applied during the last stages of the sealing operation usually is considerably above that of the fusing temperature of the cellulose material from which the cap is made and said temperature may be as high as 600° F. This high temperature serves a double purpose—first, it provides a perfectly fused and solid cap and seal and, second, it provides a thoroughly sterilized seal, by reason of the high temperature to which the seal is subjected during the last stages thereof.

In Fig. 12 is shown the position of the container at the moment when the seal is applied and the jaws are clamped about the mouth of the container for weld sealing the cap in position. The jaws are now released and the container is lowered to its original position from the position shown in Fig. 12 to that shown in Figs. 13 and 14.

In order to provide for the inequalities of the crown about the mouth of the container I have provided the ends of the jaw levers with adjustable points 24 which are adjustably held by means of springs 33. It is obvious that the containers may be advanced into position and removed therefrom by any convenient means well known in the art. I, therefore, do not lay claim to mechanism for advancing the containers through the machine, which may be done by belts or chains, running the containers through in parallel along straight lines or on the turret principle.

I claim:

1. The method of making and sealing caps on containers which comprises suspending the capping blank, then centering the mouth of a container to be capped and sealed beneath said blank, then pleating the peripheral zone of said blank over the crown of the container and warming said pleats to a molding temperature, then ironing down said pleats to bring the cap forming material into contact with the container, and heating the material at its fusing temperature to form a seal.

2. The method of making and sealing caps on containers which comprises forming blanks of thin sheets of transparent cellulose material, then centering a blank over the mouth of a container, then supplying the peripheral zone of the blank with radial folds at a temperature sufficient to soften the transparent cellulose material, and pressing said folds over the crown of the container to thereby smooth out the folds, and finally compressing the cap forming cellulose material about the mouth of the container at a fusing temperature to thereby form a transparent seal.

3. The method of making and sealing caps on containers which comprises cutting blanks from thin sheets of cellulose acetate as and when required and suspending the said blanks individually in position to be received by a container, then centering a container beneath said blank as the same is suspended, then moving the container up against the blanks so that the outer skirt of the blank is folded over the crown of the container, then warming the folds and forcing the same against the crown of the container, and then increasing the temperature of the folded material and compressing the same about the mouth of the container to form a cap and seal.

4. The method of sealing containers with cellulose material which comprises stamping a blank from said material and bringing said blank and container to be capped thereby in contact, forcing the container upward against the blank of material so that the outer peripheral zone of the blank will be folded about the mouth of the container, and during the folding action supplying to the outer peripheral zone of the blank sufficient heat to just soften the cellulose material, then compressing the folded heat softened peripheral zone of the blank laterally and increasing the temperature of the heat supplied to the outer zone of the blank to a molding temperature while the container with the cap is moved vertically against the compressing action.

5. In an apparatus for making caps and sealing containers, means for cutting cap forming blanks from thin sheets of cellulose acetate, means for conveying said blanks and suspending the same successively above the mouths of containers to be capped and sealed, means for raising each container to engage a blank, means for forming predetermined folds on said blank as the same is enveloped about the mouth of the container, a head having jaws for closing on the blank folds while the container is moving vertically against the pressure of said jaws, means for supplying heat on said jaws and to the fold forming means sufficient to permit said fold forming means to give a permanent set to said folds as they are being formed, and to provide a heated temperature to said jaws of a sufficient degree so that the closing action thereof will cause the material of said folds to be intimately adhered to the sides of the container.

6. In an apparatus for making caps and sealing containers, means for cutting cap forming blanks from thin sheets of cellulose acetate, means for conveying said blanks and suspending the same, a head with which said blank conveying means cooperates for supplying each container with a blank, means carried by said head for effecting directional folds in the cap forming blank to shape the same into a cap on the container, jaws on said head for engaging with and compressing the folds formed in the cap forming material, heating elements in said jaws, for providing said jaws with a temperature sufficient to cause said jaws to warm the material of said folds to a molding temperature when they first engage the same, and with a temperature sufficient to cause said jaws to heat the material at a fusing temperature when said jaws have fully closed upon said folds.

7. In an apparatus for making caps and sealing containers, means for cutting cap forming blanks from thin sheets of cellulose acetate, means for conveying said blanks and suspending the same, a head with which said blank conveying means cooperates for supplying each container with a blank, a plate having an opening therein and surrounded with spaced fingers for effecting directional folds in the cap forming blank, a head having heated jaws, and means for closing said jaws over the directional folds of said cap forming blank, and means for effecting a predetermined fusing temperature in said jaws as they close on the cap forming material.

8. In an apparatus for making caps and sealing containers, means for forming blank discs as and when required, a ring for receiving a formed blank disc and suspending the same above the mouth of a container to be sealed, a heated pleating plate above said ring to seat and pleat the blank disc, a pad to hold said disc on the mouth of the container while the pleating is effected, a head having jaw members, means for closing said jaw members over the heated material, and means for heating said jaws so that they will have a fusing temperature as they are closed over the material.

9. In an apparatus for applying a sheet of cellulose acetate to a container to provide a sealing cap therefor, means folding the outer peripheral edge of said cap forming sheet over the crown of the container, and heating means to provide said folding means with a sufficient temperature as it operates to fold said edge of said cap forming sheet over said crown to increasingly heat up said cellulose acetate material so that it will become adhered to the container when the folding operation is completed.

10. In an apparatus for applying a sheet of cellulose acetate to a container to provide a sealing cap therefor, heated means for folding the outer edge of said cap forming sheet over the crown of the container at molding temperature, and means for pressing said folded edge against the container at a temperature sufficient to intimately adhere the material of said edge thereto.

11. In an apparatus for applying a sheet of cellulose acetate to a container to form a sealing cap therefor, means for producing radial folds in the peripheral edge of the sheet, means comprising a plurality of jaws for closing on a constantly increasing surface of said radial folds to compress and fold the same over the crown of the container, and heating means for providing said jaws with a sufficient temperature so that they will produce an ironing effect on said folds, and finally will intimately adhere said folds to the surface of the container.

12. In an apparatus for making caps and sealing containers, means for cutting cap forming blanks from thin sheets of cellulose acetate, means for conveying said blanks and suspending each of the same successively above the mouth of a container to be capped and sealed, means for folding the outer edge of each cap forming blank over the mouth of the container and for applying first a molding heat and then a fusing heat to the material of said edge as it is being folded.

13. In an apparatus for applying a formed sheet of cellulose acetate to a container to form a sealing cap therefor, means for providing predetermined pleats in the outer edge zone of said cap forming sheet, and means for forming said pleated edge zone over the crown of the containers and for compressing the same against the sides of the container, said means being provided with means for applying to said pleated edge zone during the folding and compressing action, first, a sufficient degree of heat to make the material thereof plastic, and then a degree of heat to cause the same to become intimately adhered to the sides of the container.

14. The method of sealing containers with cellulose material which comprises stamping a blank from said material and bringing said blank and container to be capped thereby in contact, forcing the container upward against the blank of material so that the outer zone of the blank will be caused to fold over the top of the container, and during this folding action supplying the said outer zone of the blank with a sufficient amount of heat to make the cellulose material of said zone plastic, then compressing the folded plastic outer zone of the blank laterally, and during this compressing action increasing the temperature of the heat so that the cellulose material will become intimately adhered to the container.

15. The method of sealing containers with a sheet of cellulose acetate material which comprises folding the outer peripheral edge zone of said sheet of material over the crown of the container and then compressing said edge zone against the sides of the container and providing the material of said edge zone with a constantly increasing heat during the compressing operation.

16. The method of sealing containers with a sheet of cellulose acetate material which comprises folding the outer peripheral edge zone of said sheet of material over the crown of the container, and then compressing said edge zone against the sides of the container, and during the compressing operation providing the material of said edge zone, first, with a temperature just sufficient to reduce the same to molding constituency and then with a temperature sufficient to cause it to become intimately adhered to the sides of the container.

HENRY F. GLUNZ.